(12) United States Patent
Bohnert et al.

(10) Patent No.: US 6,740,866 B1
(45) Date of Patent: May 25, 2004

(54) FIBRE BRAGG-GRATING SENSOR

(75) Inventors: Klaus Bohnert, Oberrohrdorf (CH);
Hubert Brändle, Oberengstringen (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 09/868,188

(22) PCT Filed: Dec. 16, 1999

(86) PCT No.: PCT/CH99/00608
§ 371 (c)(1),
(2), (4) Date: Jun. 15, 2001

(87) PCT Pub. No.: WO00/39553
PCT Pub. Date: Jul. 6, 2000

(30) Foreign Application Priority Data

Dec. 28, 1998 (DE) .......................... 198 60 409

(51) Int. Cl.⁷ .................................. G01J 5/08
(52) U.S. Cl. .................. 250/227.14; 385/13; 73/862.42
(58) Field of Search ............... 250/227.11, 227.14, 250/227.16, 227.28, 227.21; 385/10, 12, 13; 73/862.381, 862.391, 862.42, 705

(56) References Cited

U.S. PATENT DOCUMENTS

| | | | |
|---|---|---|---|
| 4,761,073 A | 8/1988 | Meltz et al. | |
| 5,042,898 A | 8/1991 | Morey et al. | |
| 5,113,070 A | 5/1992 | Smith | |
| 6,304,686 B1 * | 10/2001 | Yamate et al. | 385/13 |
| 6,490,931 B1 * | 12/2002 | Fernald et al. | 73/705 |

FOREIGN PATENT DOCUMENTS

| | | |
|---|---|---|
| DE | 873304 | 4/1953 |
| DE | 19648403 C1 | 4/1998 |
| EP | 0466623 A1 | 1/1992 |
| EP | 0713077 A1 | 5/1996 |
| WO | WO 85/04473 | 10/1985 |

OTHER PUBLICATIONS

"Optical In–Fibre Grating high Pressure Sensor", Xu, et al., Electronics Letters, vol. 29, No. 4, Feb. 18, 1993, pp. 398–399.

* cited by examiner

*Primary Examiner*—Kevin Pyo
(74) *Attorney, Agent, or Firm*—Burns, Doane, Swecker & Mathis, L.L.P.

(57) ABSTRACT

The subject matter of the present invention is a fiber Bragg grating sensor 1, 25 which is suitable, in particular, for measuring differential pressures and flow rates $v_1$ in oil drill holes. The sensor principle according to the invention is based on using a transducer 1 with two pressure chambers $7a$, $7b$ to convert a hydrostatic pressure difference between two liquid or gaseous media $11a$, $11b$ into a longitudinal fiber elongation or fiber compression and measuring it via the displacement of the Bragg wavelength $\Delta\lambda_B$ of at least one fiber Bragg grating 3, 4. Exemplary embodiments are specified which have two fiber Bragg gratings 3, 4 which are sensitive to elongation in opposite senses and which have temperature-compensating transducers 1, and which have a plurality of transducers 1 in a wavelength-division-multiplexing configuration. One embodiment relates to measuring a flow rate $v_1$ with the aid of a venturi tube 23.

21 Claims, 10 Drawing Sheets

FIBRE BRAGG-GRATING SENSOR

The present invention relates to the field of fiber-optic pressure and temperature measurement. It proceeds from a fiber-optic sensor according to the preamble of claims 1 and 12.

In oil production, drill holes have to be monitored with regard to pressure and temperature. The liquid pressures in the drill hole can be up to 100 MPa (1000 bar), and the temperatures can be up to over 200° C. Electric sensors such as, for example, piezoelectric resistors, piezoelectric elements, capacitive probes or crystal resonators, or optical pressure sensors such as, for example, Fabry-Perot resonators or elastooptic sensors are frequently used in pressure measurement up to approximately 170° C.

A fiber-optic pressure sensor in accordance with the preamble is known from the article by M. G. Xu et al., "Optical In-Fibre Grating High Pressure Sensor", Electronics Letters 29 (4), pages 398–399 (1993). There, fiber Bragg grating sensors are presented for measuring isotropic pressures of liquids. The Bragg grating of a sensor fiber is exposed directly to the all round hydrostatic pressure of a fluid. A substantial disadvantage consists in that the isotropic pressure sensitivity for Bragg gratings in glass fibers is exceptionally low (typically 0.0003 nm/100 kPa specific Bragg wavelength displacement at 1550 nm). In addition, because of the high temperature sensitivity (typically 0.01 nm/° C.), it is necessary to compensate temperature effects.

An optical sensor with fiber Bragg gratings for measuring material elongations is disclosed, for example, in U.S. Pat. No. 4,761,073. For the purpose of monitoring body deformations, the sensor fiber is typically fastened on the surface of the body or embedded in the body. It is proposed to eliminate signal interference owing to thermal grating elongations with the aid of superimposed gratings of various reflection wavelengths.

U.S. Pat. No. 5,042,898 exhibits a temperature-stabilized fiber Bragg grating which can be used as wavelength standard to stabilize the emission wavelength of laser diodes, or as a wavelength filter in fiber optic sensors. The fiber is held between two supports of suitable thermal expansion and length such that the thermally induced changes in the Bragg wavelength are compensated.

It is the object of the present invention to specify a fiber Bragg grating pressure sensor which is suitable for measuring differential isotropic pressures in liquids or gases and is distinguished by good measuring sensitivity and a large measuring range. This object is achieved according to the invention by means of the features of claims 1 and 12.

The invention specifies a fiber-optic sensor for differential pressure measurements which comprises a transducer with pressure members for holding two fluids, the transducer being configured for converting the medium pressures into a longitudinal elongation or compression of at least one fiber Bragg grating of a sensor fiber. The transducer therefore exchanges pressure with the two fluids, is deformed by their pressures and transforms the deformation into a change in length of the sensor fiber in the region of a fiber Bragg grating. The deformation of the transducer depends on the absolute pressures and/or directly on the differential pressure.

In first exemplary embodiments, a fiber Bragg grating is held between two pressure members which can be elongated by the pressures of the fluids.

In second exemplary embodiments, a fiber Bragg grating is held between a supporting member fastened on the transducer housing and a pressure member which can be elongated by the pressure difference between the two fluids.

In addition, for the purpose of error compensation, a fiber Bragg grating can be fitted between the pressure members or a pressure member and supporting member such that the measuring signal is oppositely directed and interfering signals are codirectional, and a doubled noise-free difference signal can be formed.

Another exemplary embodiment constitutes a serial, reflexive multiplex arrangement of a plurality of fiber Bragg grating differential pressure sensors with different Bragg wavelengths which are fed via a common broadband light source and detected in a wavelength-selective fashion.

A preferred application of the differential pressure sensor is use in conjunction with a venturi tube for the purpose of determining a flow rate.

Further designs, advantages and applications of the invention follow from the dependent claims and from the description, which now follows, with the aid of the figures.

With reference to a differential pressure sensor according to the invention, in the drawing:

FIG. 1 shows a transducer (=pressure transmission element) with two concentric pressure cylinders: (a) arrangement for the elongation of a fiber Bragg grating; (b) arrangement with temperature-compensating pressure cylinders; (c) arrangement for an oppositely directed elongation of two fiber Bragg gratings for compensating signal interference from temperature and all round pressure of a medium;

FIG. 2 shows a transducer with two serial pressure cylinders (a) for the elongation of a fiber Bragg grating, or (b) for the oppositely directed elongation of two fiber Bragg gratings;

Identical parts are provided with identical reference symbols in the figures.

The subject matter of the invention is a fiber-optic pressure sensor. The known measuring principle consists in that a fiber Bragg grating which is written into a monomode fiber by UV light acts as a reflection or transmission filter with a characteristic Bragg wavelength $\lambda_B$. Longitudinal fiber elongations change the grating period and refractive index and displace the Brag wavelength $\lambda_B$. The output signals are wavelength-coded and independent of the light power. The measuring range is limited only by the fiber ultimate strength in the case of elongation measurements with the aid of Bragg gratings.

The invention is explained firstly with regard to FIGS. 1–4. The fiber-optic pressure sensor 1, 25 comprises a transducer 1 with a sensor fiber 2 which has at least one fiber Bragg grating 3, 4, 5, comprising at least one first pressure member 7a for holding a first medium 11a under an all round pressure $p_1$, comprising at least one second pressure member 7b for holding a second medium 11b under an all round pressure $p_2$, and being configured for measuring a pressure difference $p_1-p_2$ by converting the all round pressures $p_1$, $p_2$ into a longitudinal elongation or compression of at least one fiber Bragg grating 3, 4 of the sensor fiber 3. The transducer is advantageously configured for a differential elongation of the fiber Bragg grating 3, 4 induced by the pressure difference $p_1-p_2$. In particular, the sensor 1, 25 is suitable for measuring differential pressures and flow rates in oil drill holes.

In the exemplary embodiments illustrated, the sensor fiber 2 is mounted between holders 6a, 6b, 6c; 15b and preferably prestressed, the holders 6a, 6b, 6c; 15b are connected in a force-closed fashion to the pressure members 7a, 7b and, if appropriate, to supporting members 15a, and the pressure members 7a, 7b are configured to deflect at least one holder 6a, 6b, 6c as a function of the pressures $p_1$, $p_2$, Preferably, exactly two cylindrical pressure members 7a, 7b are provided, which are arranged concentrically, in parallel or serially relative to one another, the pressure cylinders 7a, 7b have the same length L and the holders 6a, 6b, 6c are fastened on plunger faces 8, 8a, 8b of the pressure cylinders 7a, 7b.

The transducer 1 is to have separate inlets 10a, 10b for the media 11a11b into the pressure members 7a, 7b. A fiber Bragg grating 3 can be provided for differential pressure measurement, a fiber Bragg grating 4 can be provided for error compensation, and/or a fiber Bragg grating 5 can be provided for temperature measurement. Typically, of the fiber Bragg gratings, 3 is always, 4 is sometimes and 5 is not mechanically prestressed. They are characterized by different Bragg wavelengths $\lambda_B$ and can be read out spectrally in a separate fashion.

The transducer 1 has pressure-tight fiber bushings 12a, 12b for the sensor fiber 2 and/or a cavity 13 for a fiber Bragg grating 5 for the purpose of temperature measurement. At least one block with a bore for lateral support of the sensor fiber 2 in the region of a fiber Bragg grating 3, 4 is to be provided for a compression arrangement (not illustrated). A very much larger pressure measuring range can be realized because glass fibers can be loaded 20 times more in terms of pressure than elongation.

Figure 1A:
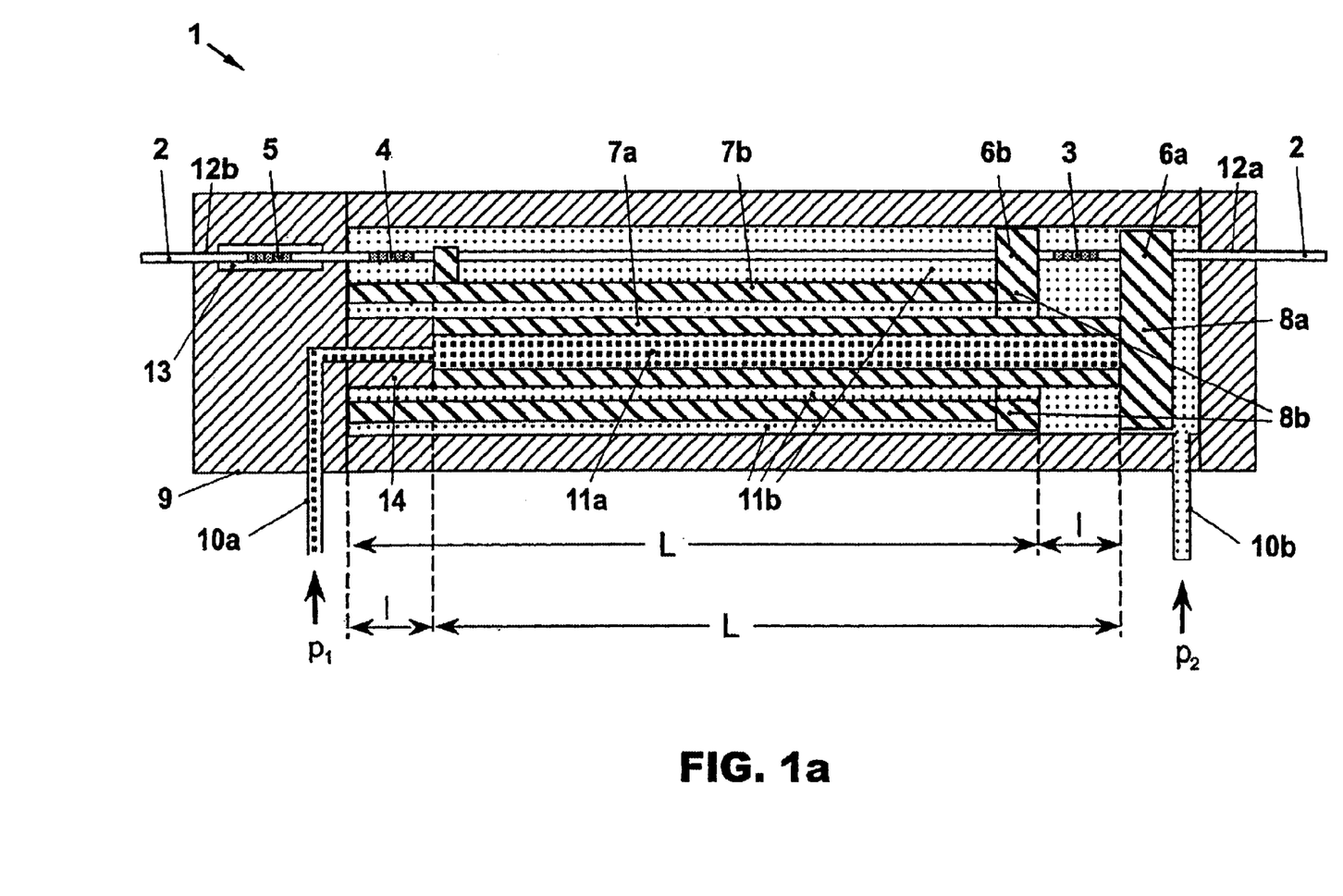
Figure 1B:
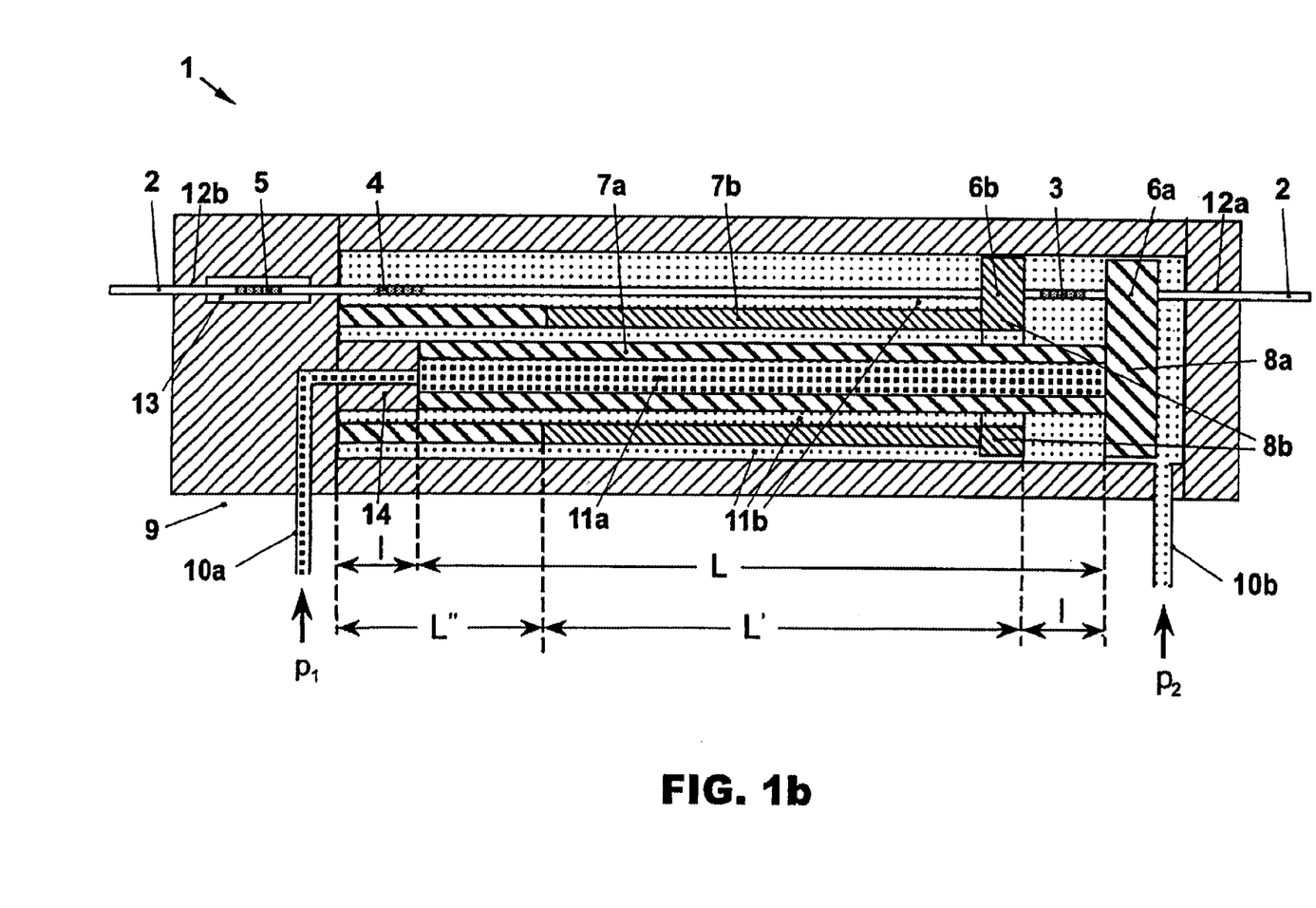
Figure 1C:
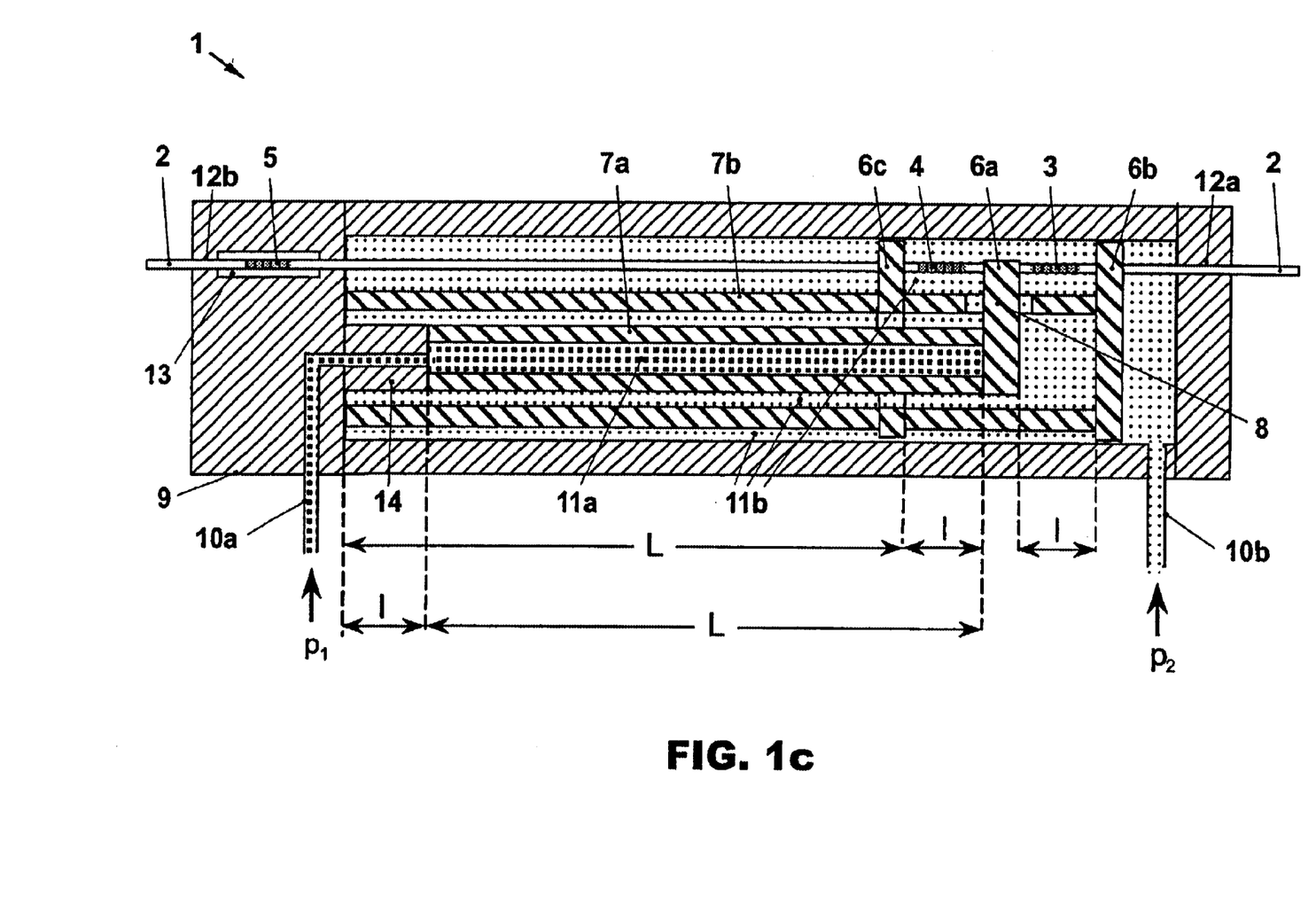
Figure 3A:
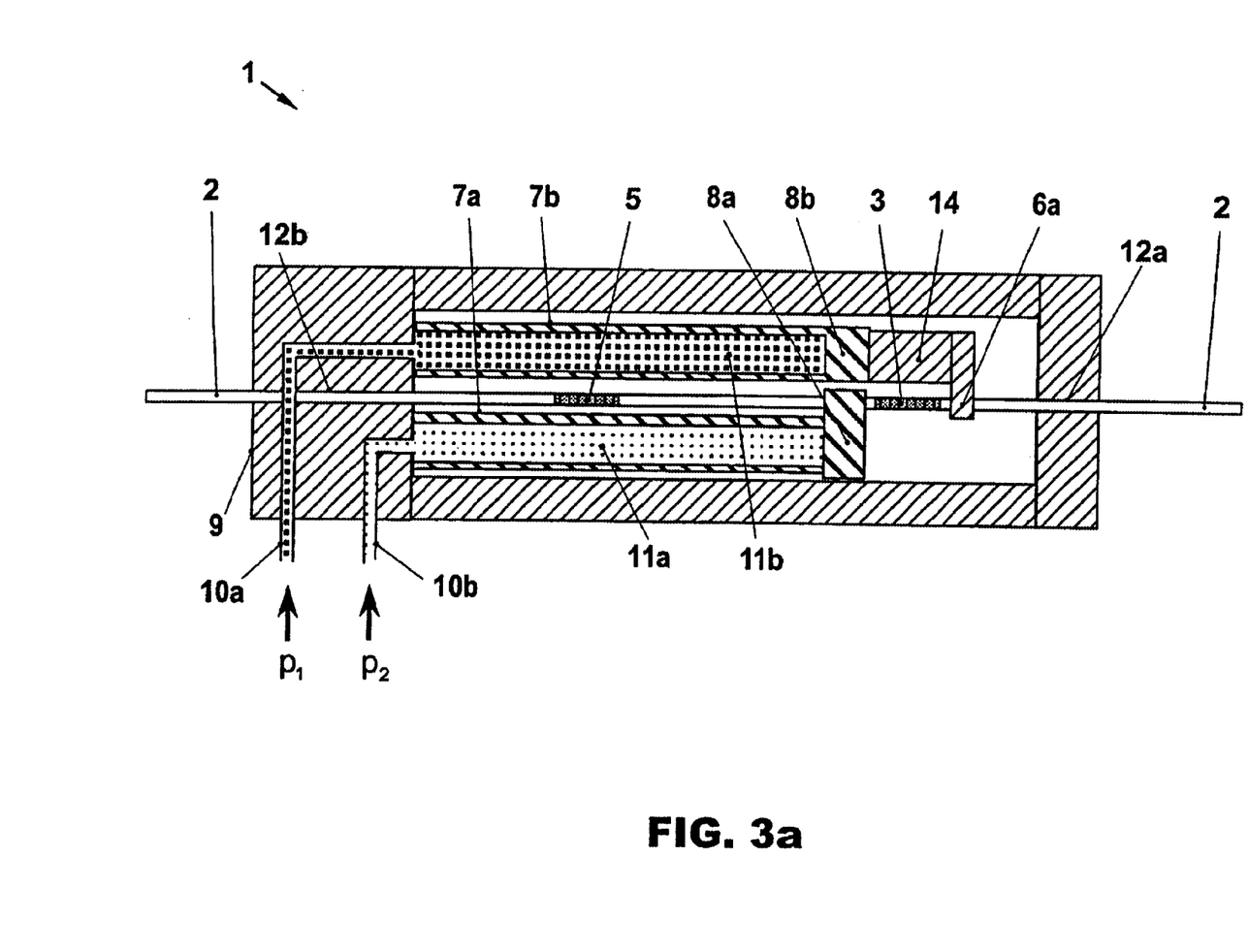
FIGS. 3(a), (b) show a transducer with two parallel pressure cylinders for the elongation of a fiber Bragg grating.
Figure 3B:
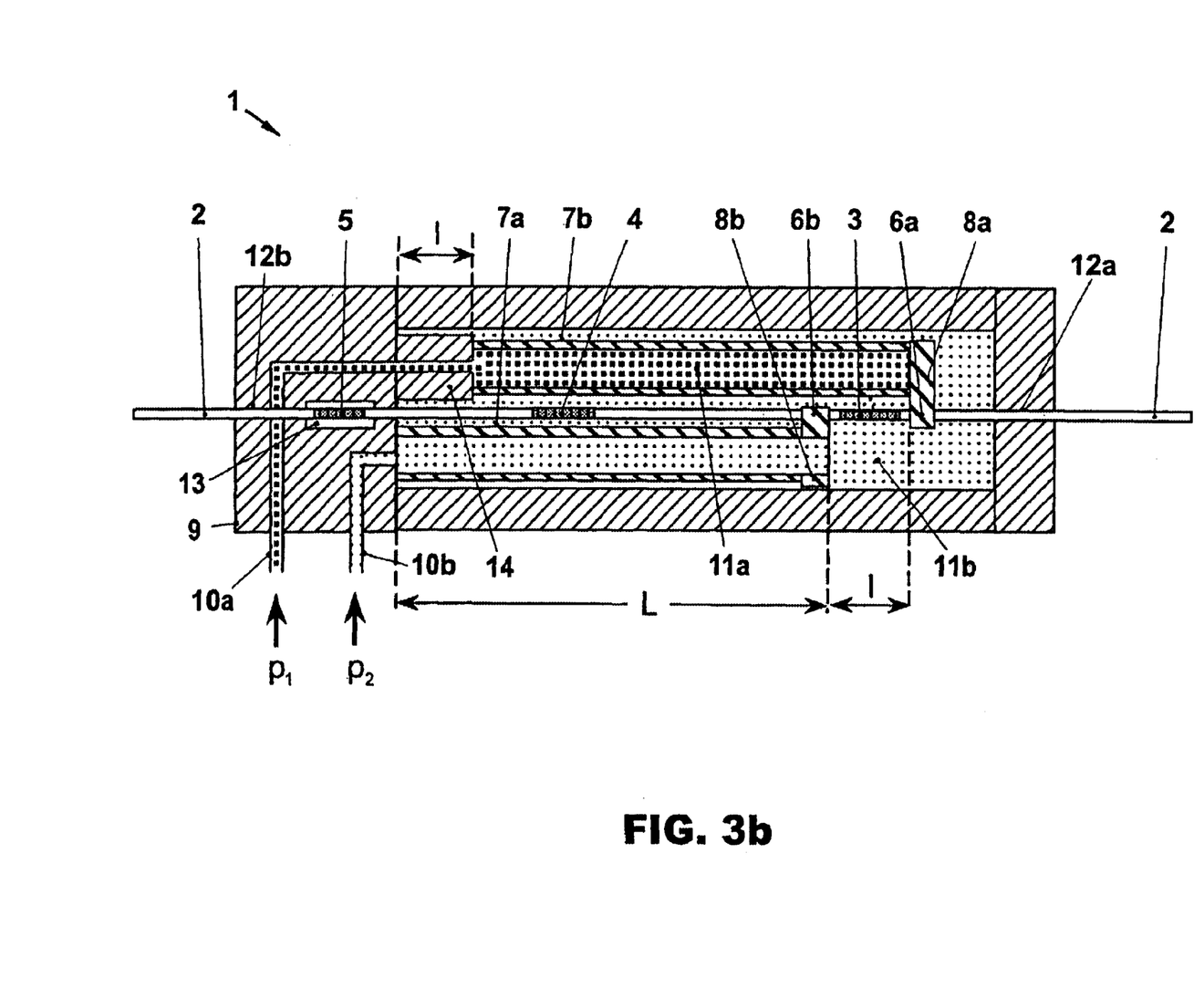

FIGS. 1 and 3 show arrangements in which a fiber Bragg grating 3 is fixed for the purpose of differential pressure measurement by holders 6a, 6b between the first and second pressure member 7a, 7b. In particular, for the purpose of antiphasal change in elongation, in accordance with FIG. 1c an error compensation fiber Bragg grating 4 can be fastened, between holders 6a, 6c, in reverse sequence between the second and first pressure members 7b, 7a. That is to say, the sensor fiber sections with the fiber Bragg gratings 3, 4 are arranged on both sides of the end plate or plunger face 8 of the first pressure cylinder 7a and are connected at their opposite ends to the second pressure cylinder 7b. As a result, elongations owing to differential pressures $p_1-p_2$ are opposed to one another, and interfering elongations owing to isotropic pressure, temperature dependencies of the fiber Bragg gratings 3, 4 and thermal expansion of the pressure members 7a, 7b are rendered codirectional. It is therefore possible to eliminate the interference signals and double the useful signal by forming a difference signal between the first and second fiber Bragg grating 3, 4.

Figure 2A:
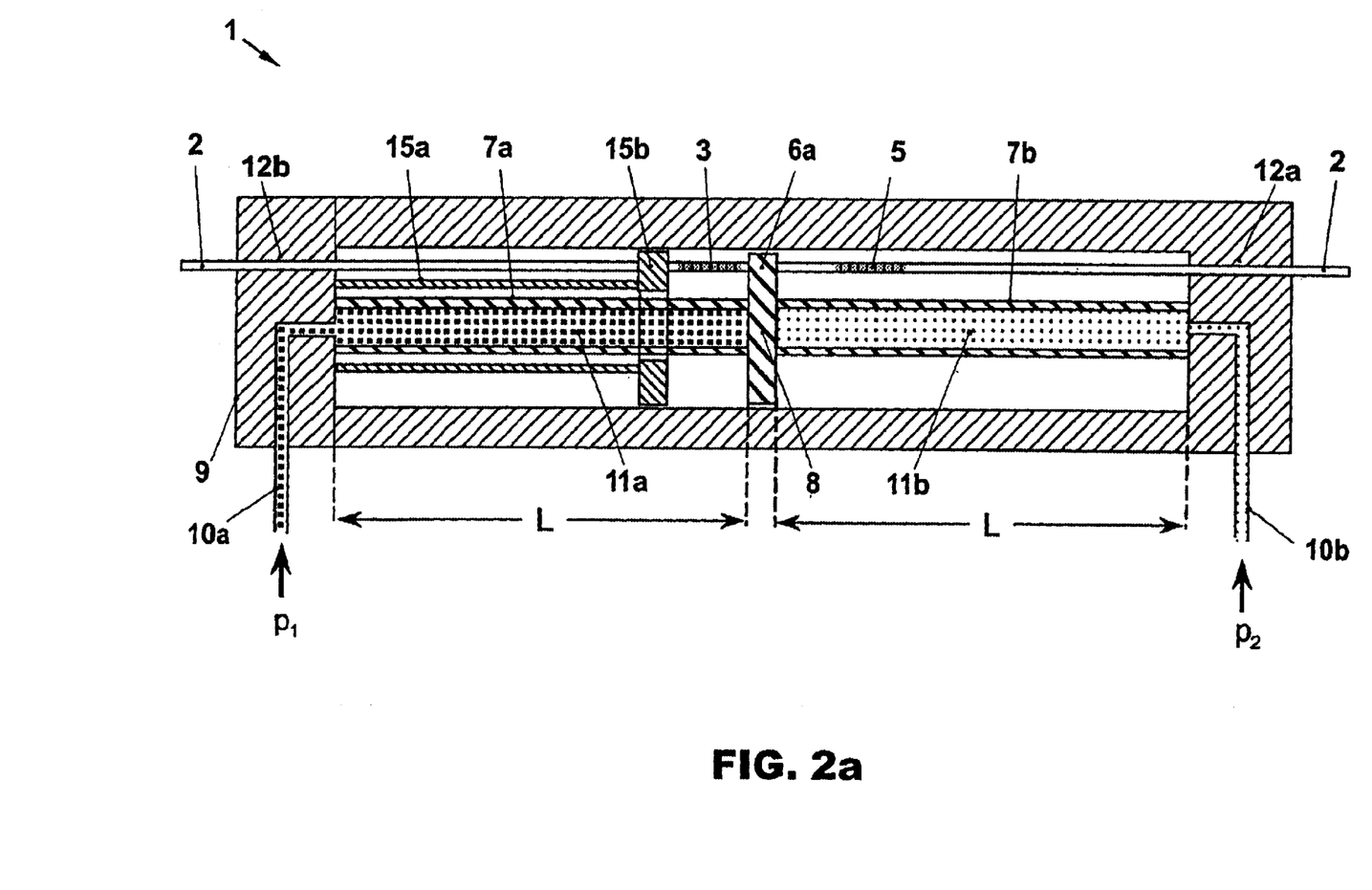
Figure 2B:
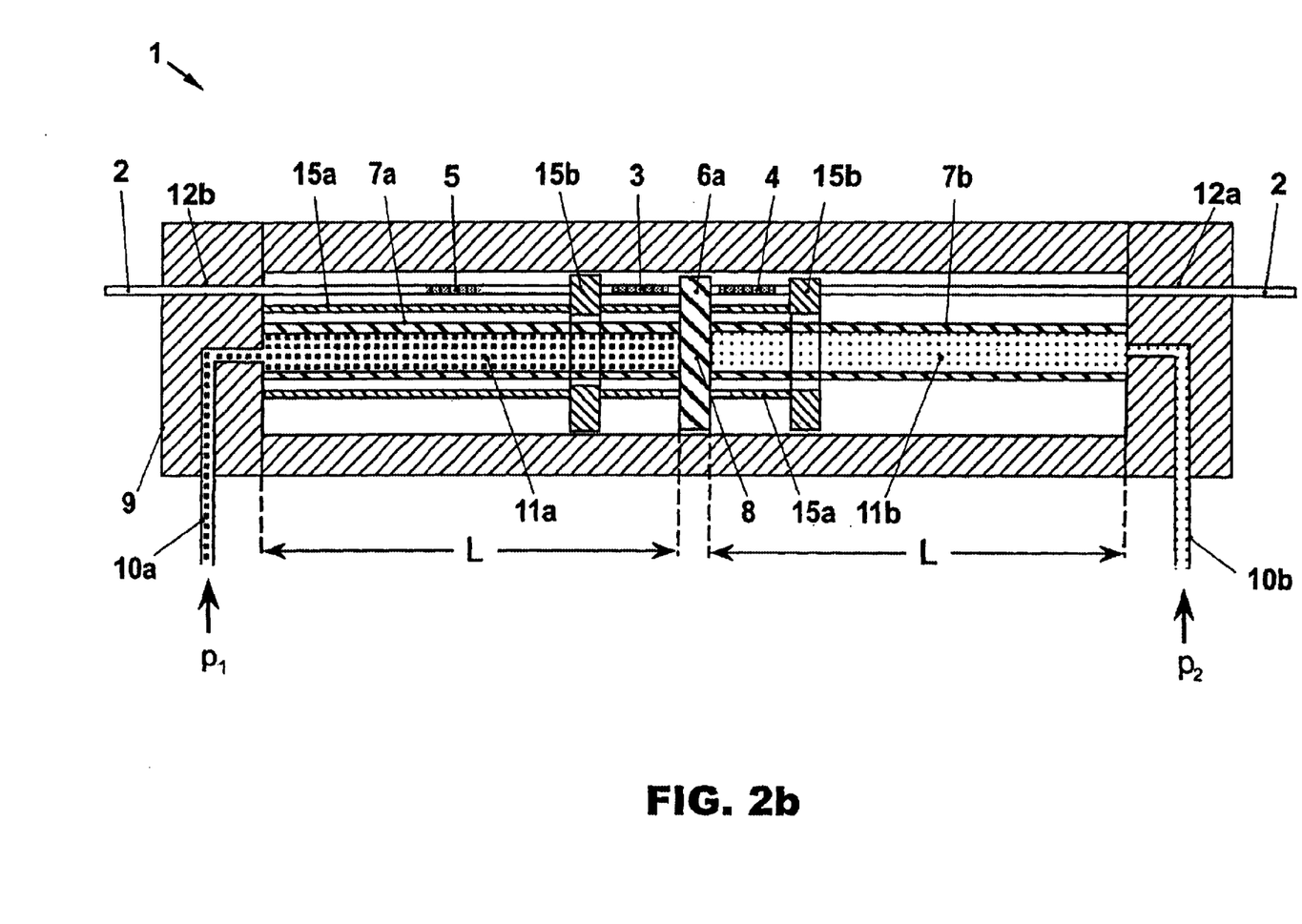

FIG. 2 show arrangements in which a fiber Bragg grating 3 is mounted, on holders 6a, 15b, between a holder 6a, which can be deflected by differential pressure between two pressure members 7a, 7b, and a supporting member 15a, which is permanently connected to the transducer housing 9. The pressure members 7a, 7b are preferably arranged serially one behind another and have a common end plate 8 by which the holder 6a is connected. In particular, in FIG. 2b a prestressed error compensation fiber Bragg grating 4 is held (6a, 15b) for the purpose of antiphasal change in elongation in reverse sequence between the supporting members 15a and the holder 6a which can be deflected by differential pressure. That is to say, the fiber Bragg gratings 3 and 4 are connected on both sides of the holder 6a to the substantially fixed supporting member 15a via the holders 15b. The above discussed compensation according to the invention of interference effects in the differential signal can be achieved, in turn, thereby.

A detailed analysis of the mode of operation of the differential pressure sensor 1 is given with the aid of FIG. 1a. The first pressure cylinder 7a is mounted on a projection or base 14, is sealed at the other end by an end plate 8a and subjected to an internal pressure $p_1$ and an external pressure $p_2$, The concentric second pressure member 7b is mounted on the housing 9, has an open end plate 8b and is exposed to the second pressure $p_2$ inside and outside via the inlet 10b. L denotes the length of the pressure cylinder 7a, 7b, and l denotes the length of the elongation length of the sensor fiber 2 and the length of the base 14. A variant with parallel pressure members 7a, 7b is shown in FIG. 3b.

The differential longitudinal elongation ∂L of the pressure members 7a, 7b depends on the pressure-induced longitudinal stresses and also, via the Poisson transverse elongation, on the radial and tangential stresses in two pressure members 7a, 7b. The result for pressure members 7a, 7b of equal length L, equal modulus of elasticity E and equal Poisson number $\mu$ is $$\partial L = L \xi \partial p/E \xi (1-2\mu)\xi R_i^2/(R_a^2-R_i^2), \tag{G1}$$

$R_i$ being the inside radius and $R_a$ being the outside radius of the closed pressure member 7a loaded by the differential pressure $\partial p = p_1 - p_2$. The differential elongation ∂L does not depend on the absolute pressures $p_1$, $p_2$ or on the radii of the pressure members 7b. ∂L is transferred onto the fiber elongation distance l and effects a wavelength displacement of $$\partial O_B = 1.21 \, \mu m \, \xi \partial L/l \tag{G2}$$

for a fiber Bragg grating 3, 4 with a Bragg wavelength $O_B$ at 1550 nm. On the fiber elongation distance, the prestressing is to be dimensioned such that it does not vanish even in the case of maximum pressure loading. Owing to the length ratio L/l, the magnitude of the fiber elongation can be prescribed for a given transducer elongation and can, in particular, be selected as large for a high pressure resolution. For example, a length ratio of L/l>10 for the purpose of mutual tuning of the linear, hysteresis-free regions of the transducer elongation ($\Delta L/L < 0.001$) and fiber elongation ($\Delta l/l$ up to over 0.01).

A quantitative example of achievable resolution and measuring range of the differential pressure: pressure members 7a, 7b made from steel with $E = 196 \cdot 10^9$ N/m$^2$, M=0.28, L=150 mm, l=10 mm, $R_i$=4.8 mm, $R_a$=5.0 mm. The specific displacement of the Bragg wavelengths is then $\Delta\lambda/\Delta p$=480 pm/MPa, and the pressure resolution is 2.1 kPa for 1 pm wavelength resolution. The measuring range is bounded by the elastic limit of the transducer 1 to differential pressures of up to approximately 5 MPa (Bragg wavelength displacement $\Delta\lambda_B$=2.4 nm). The radii of the second pressure member 7b are non-critical and can be 6 mm and 8 mm, for example. A transducer housing 9 with an inside radius of 7.5 mm and an outside radius of 10.5 mm can withstand absolute pressures above 100 MPa.

The Bragg wavelength $\lambda_B$ of the fiber Bragg grating 3 can also be disturbed directly by the isotropic pressure $p_2$ ($\Delta\lambda_B$=a few pm/MPa), inherent thermal elongation (10.3 pm/° C. at $\lambda_B$=1550 nm) or differential thermal elongation of the pressure members 7a, 7b. In accordance with FIG. 1c, for compensation purposes a second fiber Bragg grating 4, which can be read out spectrally in a separate fashion, is exposed on an elongation distance l of the same length to the same pressure $p_2$, the same temperature and the same thermal elongation, and the noise-free difference signal of the two fiber Bragg gratings 3, 4 is evaluated. Moreover, the temperature of the transducer 1 can be monitored, by means of a third, mechanically unloaded fiber Bragg grating 5 and, if appropriate, be used to correct a differential pressure signal.

In accordance with FIG. 1b, it is possible to provide passive temperature compensation for the fiber elongation distance(s) as an alternative or in addition. For this purpose, at least one pressure member 7a, 7b and/or at least one supporting member 15a is to consist of or be assembled from materials with different coefficients of thermal expansion $\alpha_1$, $\alpha_2$, such that a differential thermal expansion between the holders 6a, 6b, 6c counteracts a thermally induced displacement of a Bragg wavelength $\lambda_B$ of the sensor fiber 2. It holds in the case of complete temperature compensation that $$(\alpha_2 \cdot L - \alpha_1 \cdot (L+l))/l = 8.0 \cdot 10^{-6} \text{ C.}^{-1} \qquad (G3)$$

$\alpha_1$, $\alpha_2$ being the coefficient of thermal expansion of the first pressure member 7a (including the base 14), and of the second pressure member 7b. By contrast with the U.S. Pat. No. 5,042,898 mentioned at the beginning, according to the invention equation G3 is used to select the cylinder length straight away, and the expansion coefficients are matched. Assuming that L=150 mm, l=10 mm and $\alpha_1=12.4 \cdot 10^{-6}$ C.$^{-1}$, it is necessary for $\alpha_2=14.0 \cdot 10^{-6}$ C.$^{-1}$. Moreover, the fiber prestressing is to be selected high enough to ensure adequate prestressing even in the case of maximum operating temperature and maximum pressure difference $p_2-p_1$. The reliability of the differential pressure measurement is clearly improved by the temperature compensation.

In addition to linear coefficients of thermal expansion in accordance with equation G3, suitable transducer materials are also to have a low degree of nonlinearity in thermal expansion, a high corrosion resistance of up to 230° C., a similar modulus of elasticity E and a similar Poisson number $\mu$. This restricts the selection of steels, and in many instances passive temperature compensation cannot be carried out, or can be carried out only incompletely. According to the invention, the pressure or supporting members 7a, 7b, 15a can be assembled from at least two segments with different coefficients of thermal expansion and prescribable lengths L', L". In the exemplary embodiment according to FIG. 1b, the second cylinder 7b is constructed from segments L" with $\alpha_1$ and L' with $\alpha_2$. The modified condition for the temperature compensation runs $$(\alpha_2 \cdot L' - \alpha_1 \cdot (L'+l))/l = 8.0 \cdot 10^{-6} \text{ C.}^{-1} \qquad (G4)$$

Thus, for given coefficients of expansion $\alpha_1$, $\alpha_2$, the differential expansion of the pressure members 7a, 7b can be tailored by selecting the segment lengths L', L" (where L'+L"=L). For example, a nickel-based alloy (for example "Hastealloy C-22" from Hynes International with $\alpha_1=12.4 \cdot 10^{-6}$ C.$^{-1}$) is combined with a chromium-nickel steel (for example "AISI 304" with $\alpha_2=17.0 \cdot 10^{-6}$ C.$^{-1}$). For L=150 mm and l=15 mm the result is L'=44.3 mm and L"=105.6 mm.

An advantage of the temperature-compensated arrangement according to FIG. 1b consists in that only the first fiber Bragg grating 3 is mechanically prestressed. Interference owing to isotropic pressure $p_2$ is detected with the aid of the now unloaded fiber Bragg grating 4 and the temperature dependence of the latter is corrected with the aid of the fiber Bragg grating 5. The passive temperature compensation in accordance with FIG. 1b reduces the Bragg wavelength spectral region required for a fiber sensor 1. It can be applied in principle in the case of all exemplary embodiments.

The arrangements according to FIGS. 2a, 2b and 3a have the advantage that the fiber Bragg gratings 3, 4, 5 are not exposed to the pressure of the medium 11b. The interior of the transducer 1 outside the pressure members 7a, 7b can be filled with a vacuum or a low-pressure gas. The pressure members 7a, 7b are to be designed for the full pressure loading $p_1$ or $p_2$. The measuring range for differential pressures then extends up to $p_1$ or $p_2$. The pressure resolution is approximately 100 kPa for L=150 mm, wall thicknesses designed up to 100 MPa and a 1 pm spectral resolution. FIG. 3a shows a variant with two parallel pressure members 7a, 7b, which are loaded exclusively by internal pressure $p_1$ or $p_2$, a prestressed fiber Bragg grating 3 for differential pressure measurement, and an unloaded fiber Bragg grating 5 for temperature measurement. The fiber Bragg grating 3 is held 6a, 6b between cylinders 7a, 7b of equal length via an end place 8a and an end plate 8b lengthened by the base 14 of length l.

Figure 4:
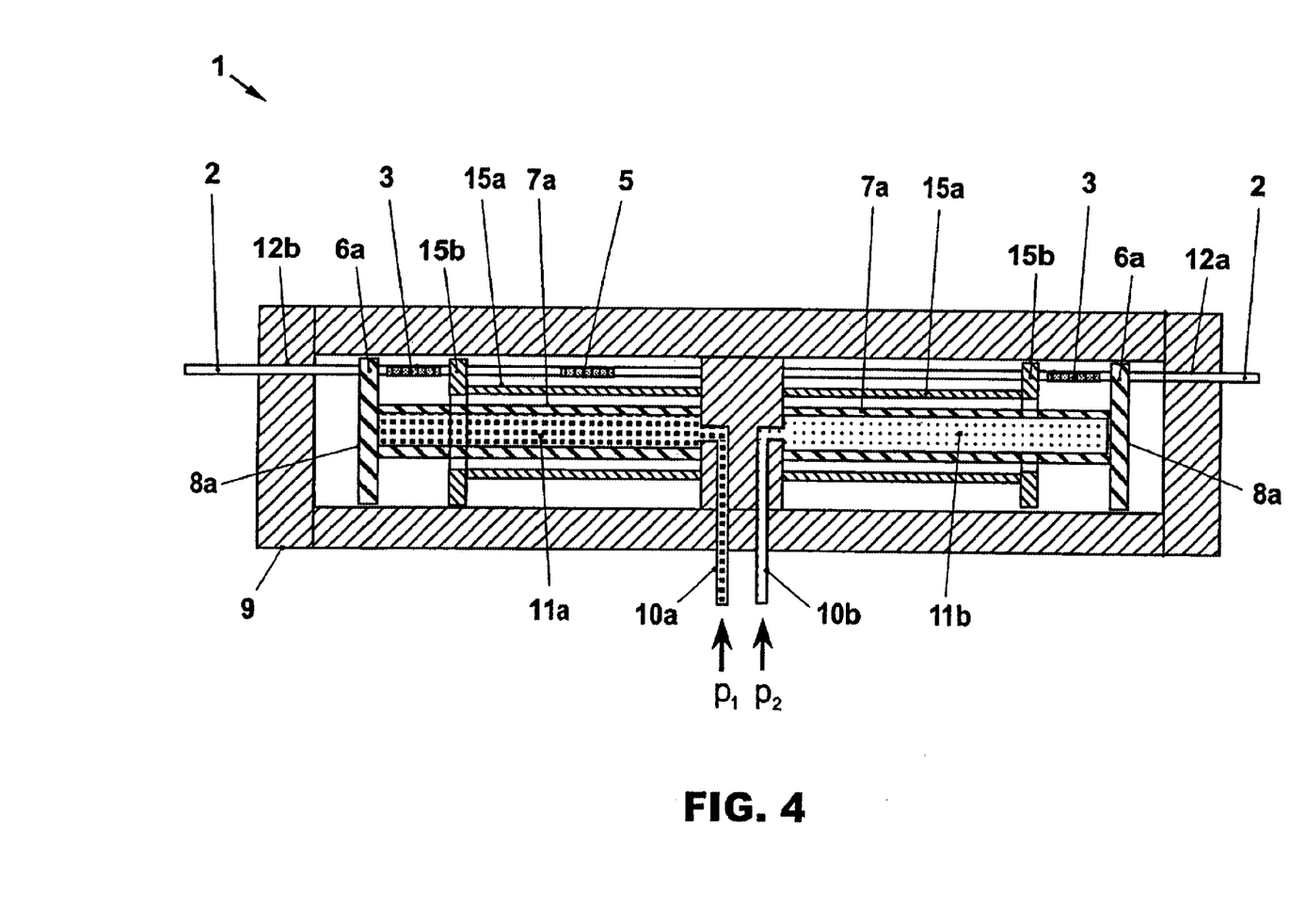
FIG. 4 shows a transducer with two pressure cylinders for a separate elongation of two fiber Bragg gratings for the purpose of measuring two absolute pressures.

FIG. 4 shows a further differential pressure sensor 1, in the case of which one fiber Bragg grating 3 each is held 6a, 15b between a first pressure member 7a and a supporting member 15a, and between a second pressure member 7a and a supporting member 15a, and a pressure difference $\partial p = p_1 - p_2$ can be determined from the separately measured elongations of the fiber Bragg gratings 3, 4. The compact arrangement of two absolute pressure measurements in a transducer 1 is advantageous in this case.

Figure 5:
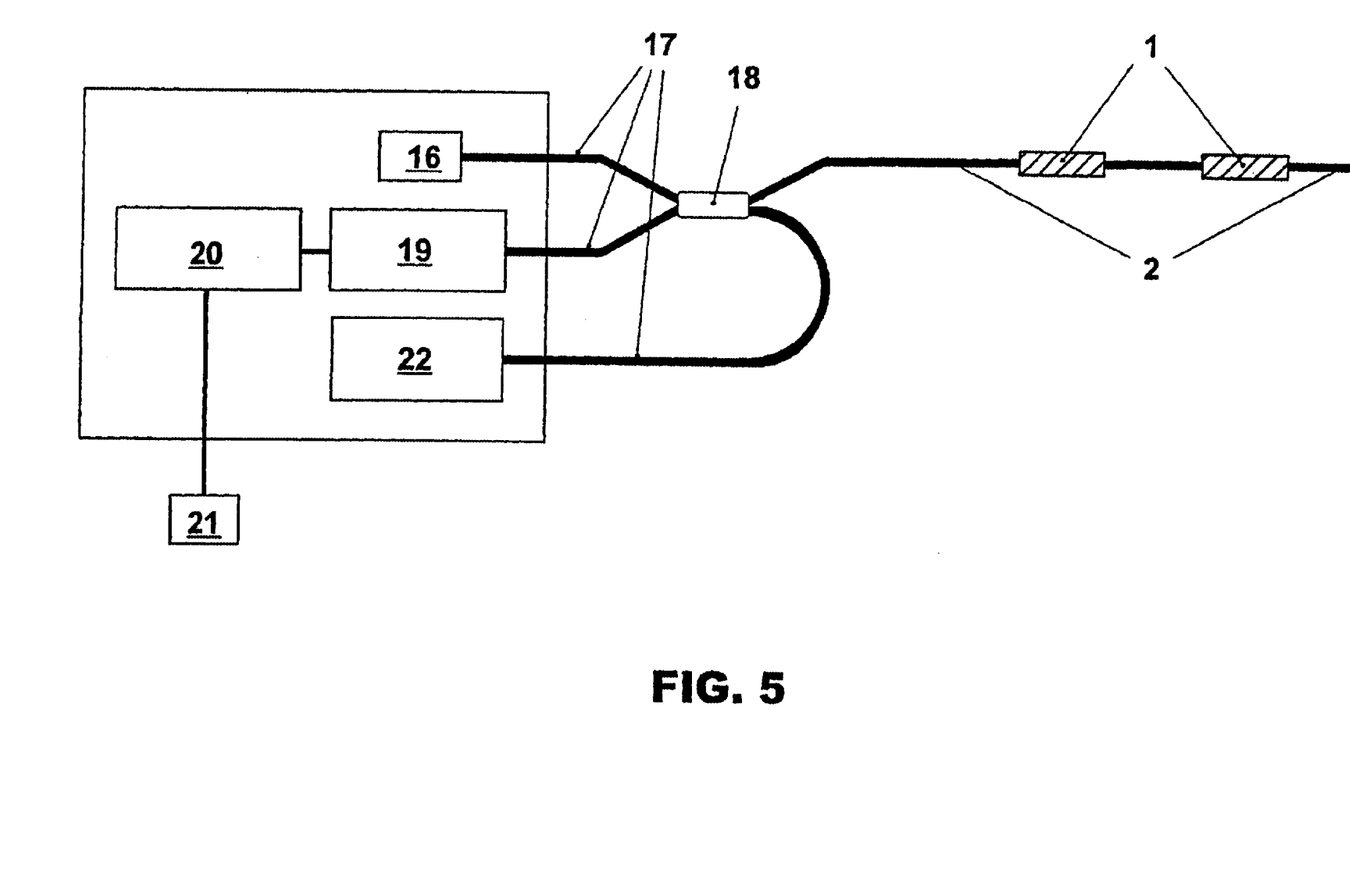
FIG. 5 shows a multiplex arrangement with a plurality of differential pressure sensors in reflection.

FIG. 5 shows a multiplex arrangement 25 with a plurality of transducers 1, according to the invention, of different Bragg wavelengths $O_B$. The transducers 1 are optically connected to a broadband light source 16, for example an LED or SLD and, preferably via a fiber coupler 18, to a wavelength-division demultiplexer 19 and a detector plus an electronic measuring system 20 (and computer 21). 22 denotes an optional source of reference wavelengths for spectral calibration of the fiber Bragg gratings 3, 4, 5. The gratings have a spectral width of approximately 0.2 nm, a maximum reflectivity of 90%, a length of 10 mm and tuning ranges of 2.4 nm for temperature (0° C.–230° C.) and 3.6 nm for differential pressure measurement (0.003 maximum elongation). With a 1 nm standby spacing relative to the tuning range of the adjacent grating, a passive temperature-compensated transducer 1 therefore requires a 7 nm spectral width. 7 transducers 1 can be multiplexed by wavelength with a low loss 1550 nm light source (50 nm spectral width). Alternatively, or in addition, the transducers 1 can also be read out sequentially one after another using a time-division multiplexing method and/or by means of fiber-optic switches.

Figure 6:
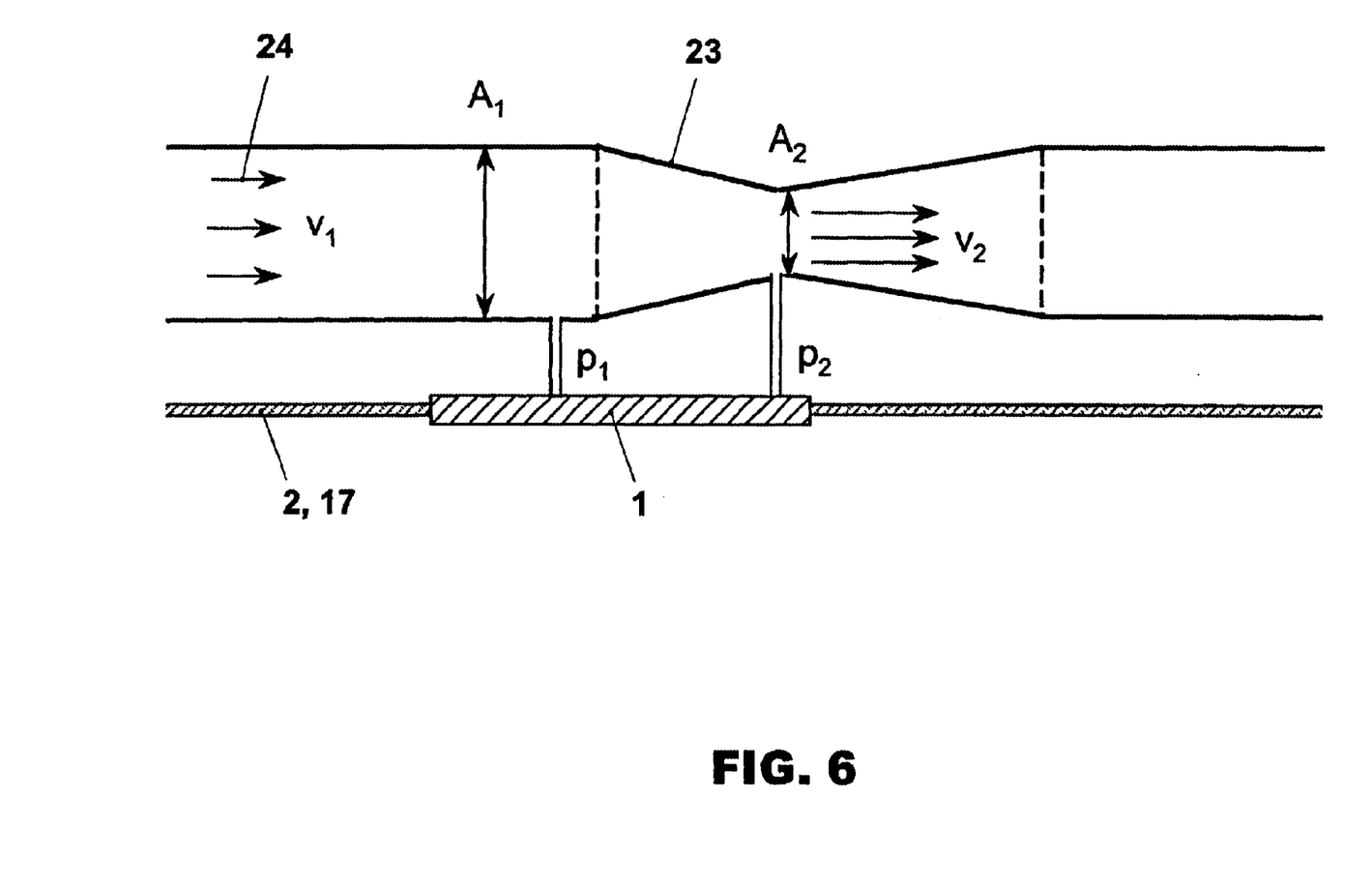
FIG. 6 shows a venturi tube with differential pressure sensor for the purpose of determining flow rates.

FIG. 6 shows one use of a fiber-optic differential pressure sensor 1, 25 according to the invention, in the case of which a flow rate $v_1$ of a fluid flow 24 is determined from a differential pressure measurement. In particular, the inlets 10a, 10b of the transducer 1 are connected to a venturi tube 23 at two locations with cross-sectional areas $A_1$ and $A_2$. The flow rate $v_1$ can be determined in a known way from the differential pressure $\Delta p = p_1 - p_2$.

The fiber-optic pressure sensor 1, 25 is characterized overall by an advantageous interaction between transducer 1, which can be exposed to extreme pressure loads, and the fiber Bragg grating 3, 4, which is very sensitive to elongation, of the sensor fiber 2. It is possible as a result to measure differential pressures of between 0.1 kPa and 10 MPa at very high absolute pressures of up to approximately 100 MPa with high resolution. A further advantage consists in that the pressure signal is wavelength-coded, and thus very insensitive to interference. It can be read out directly using fiber optics over large distances between the passive sensor head 1 and the optoelectronic measuring device 16, 19–22. Also advantageous are the good high-temperature capability, corrosion resistance and insensitivity to electromagnetic interference. Because of its compactness, the sensor 1, 25 is particularly suitable for measuring differential pressures and flow rates in drill holes.

List of Reference Symbols

| | |
|---|---|
| 1 | Fiber optic differential pressure sensor (transducer) |
| 2 | Optical fiber, sensor fiber |
| 3 | Fiber Bragg grating 1 (for pressure measurement) |
| 4 | Fiber Bragg grating 2 (for compensation measurement) |
| 5 | Fiber Bragg grating 3 (for temperature measurement) |
| 6a–6c,15b | Holders, fiber holders, ferrule holders |
| 7a–7b | Pressure members, pressure cylinders |
| 7a | Pressure cylinder 1 (internal pressure $p_i$) |
| 7b | Pressure cylinder 2 (reference pressure $p_2$), reference cylinder |
| 8, 8a, 8b | End plates of the pressure members, plunger face |
| 9 | Transducer housing |
| 10a, 10b | Inlets |
| 11a | Medium 1, fluid 1 (under pressure $p_1$) |
| 11b | Medium 2, fluid 2 (under pressure $p_2$) |
| 12a, 12b | Pressure-tight fiber bushings |
| 13 | Cavity for temperature sensor fiber |
| 14 | Projection, base |
| 15a | Supporting member, supporting cylinder |
| 16 | (Broadband) light source, LED, SLD |
| 17 | Feeder fibers |
| 18 | Coupler, fiber coupler |
| 19 | Wavelength-division demultiplexer, tunable spectral filter, Fabry-Perot filter |
| 20 | Detector and electronic measuring system |
| 21 | Computer, PC |
| 22 | Source for reference wavelengths |
| 23 | Venturi tube |
| 24 | Fluid flow |
| 25 | Overall sensor |
| $A_1, A_2$ | Cross-sectional surfaces |
| $\alpha_1, \alpha_2$ | Coefficients of thermal expansion |
| E | Young's modulus of elasticity |
| l | Length of the elongation distance of the pressure sensor fiber |
| L | Length of a pressure cylinder |
| $\Delta L$ | Differential elongation |
| L', L" | Segment lengths of a pressure cylinder/supporting cylinder |
| $\lambda_B$ | Bragg wavelength |
| $\Delta\lambda_B$ | Bragg wavelength displacement |
| $\mu$ | Poisson number |
| $p_1, p_2$ | Pressures |
| $\Delta p$ | Pressure difference |
| $R_i$ | Inside radius of the first pressure cylinder |
| $R_a$ | Outside radius of the first pressure cylinder |
| $v_1, v_2$ | Flow rates |

What is claimed is:

1. A fiber-optic pressure sensor comprising a transducer with a sensor fiber which has at least one fiber Bragg grating, wherein the transducer comprises at least one first pressure member for holding a first medium under an all round pressure $p_1$, the transducer comprises at least one second pressure member for holding a second medium under an all round pressure $P_2$, and the transducer is configured for measuring a pressure difference $p_1-p_2$ by converting the all round pressures $p_1$, $p_2$ into a longitudinal elongation or compression of the at least one fiber Bragg grating of the sensor fiber.

2. The fiber optic pressure sensor as claimed in claim 1, wherein the transducer is configured for a differential elongation of the fiber Bragg grating induced by the pressure difference $p_1-p_2$.

3. The fiber optic sensor as claimed in claim 1, wherein the sensor fiber is mounted between holders, the holders are connected in a force-closed fashion to the pressure members and to supporting members, and the pressure members are configured to deflect at least one holder as a function of the pressures $p_1$, $p_2$.

4. A fiber optic pressure sensor comprising a transducer with a sensor fiber which has at least one fiber Bragg grating, wherein the transducer comprises at least one first pressure member for holding a first medium under an all round pressure $p_1$, the transducer comprises at least one second pressure member for holding a second medium under an all round pressure $p_2$, the transducer is configured for measuring a pressure difference $p_1-p_2$ by converting the all round pressures $p_1$, $p_2$ into a longitudinal elongation or compression of the at least one fiber Bragg grating of the sensor fiber, the sensor fiber is mounted between holders, the holders are connected in a force-closed fashion to the pressure members and, optionally, to supporting members, the pressure members are configured to deflect at least one holder as a function of the pressures $p_1$, $p_2$, exactly two cylindrical pressure members are provided, which are arranged concentrically, in parallel or serially relative to one another, the pressure cylinders have the same length L, and the holders are fastened on plunger faces of the pressure cylinders.

5. The fiber optic sensor as claimed in claim 1, wherein the transducer has separate inlets for the media into the pressure members and/or a fiber Bragg grating is provided for differential pressure measurement, a fiber Bragg grating is provided for error compensation, and/or a fiber Bragg grating is provided for temperature measurement.

6. A fiber optic pressure sensor comprising a transducer with a sensor fiber which has at least one fiber Bragg grating, wherein the transducer comprises at least one first pressure member for holding a first medium under an all round pressure $p_1$, the transducer comprises at least one second pressure member for holding a second medium under an all round pressure $p_2$, the transducer is configured for measuring a pressure difference $p_1-p_2$ by converting the all round pressures $p_1$, $p_2$ into a longitudinal elongation or compression of the at least one fiber Bragg grating of the sensor fiber, and a fiber Bragg grating is held between the first and second pressure members for the purpose of differential pressure measurement.

7. A fiber optic pressure sensor comprising a transducer with a sensor fiber which has at least one fiber Bragg grating, wherein the transducer comprises at least one first pressure member for holding a first medium under an all round pressure $p_1$, the transducer comprises at least one second pressure member for holding a second medium under an all round pressure $p_2$, the transducer is configured for measuring a pressure difference $p_1 - p_2$ by converting the all round pressures $p_1$, $p_2$ into a longitudinal elongation or compression of the at least one fiber Bragg grating of the sensor fiber, and a fiber Bragg grating is held between a holder, which can be deflected by differential pressure of two pressure members, and a supporting member.

8. A fiber optic pressure sensor comprising a transducer with a sensor fiber which has at least one fiber Bragg grating, wherein the transducer comprises at least one first pressure member for holding a first medium under an all round pressure $p_1$, the transducer comprises at least one second pressure member for holding a second medium under an all round pressure $p_2$, the transducer is configured for measuring a pressure difference $p_1 - p_2$ by converting the all round pressures $p_1$, $p_2$ in a longitudinal elongation or compression of the at least one fiber Bragg grating of the sensor fiber, one fiber Bragg grating each is held between a first pressure member and a supporting member and a second pressure member and a second supporting member, and a pressure difference can be determined with the aid of the two fiber Bragg gratings.

9. A fiber optic pressure sensor comprising a transducer with a sensor fiber which has at least one fiber Bragg grating, wherein the transducer comprises at least one first pressure member for holding a first medium under an all round pressure $p_1$, the transducer comprises at least one second pressure member for holding a second medium under an all round pressure $p_2$, the transducer is configured for measuring a pressure difference $p_1 - p_2$ by converting the all round pressures $p_1$, $p_2$ into a longitudinal elongation or compression of the at least one fiber Bragg grating of the sensor fiber, and at least one pressure member and/or at least one supporting member consists of, or is assembled from materials with different coefficients of thermal expansion $\alpha_1$, $\alpha_2$, such that a differential thermal expansion between the holders counteracts a thermally induced displacement of a Bragg wavelength of the sensor fiber.

10. The fiber optic pressure sensor as claimed in claim 1, wherein the transducer has pressure-tight fiber bushings for the sensor fiber, and/or the transducer has a cavity for a fiber Bragg grating for the purpose of temperature measurement, and/or at least one block with a bore for laterally supporting the sensor fiber is provided in the region of a fiber Bragg grating for the purpose of a compression arrangement.

11. The fiber optic pressure sensor as claimed in claim 1, wherein a plurality of transducers of different Bragg wavelength $\lambda_B$ are optically connected to a broadband light source.

12. Use of a fiber optic differential pressure sensor comprising a transducer with a sensor fiber which has at least one fiber Bragg grating, wherein (he transducer comprises at least one first pressure member for holding a first medium under an all round pressure $p_1$, the transducer comprises at least one second pressure member for holding a second medium under an all round pressure $p_2$, and the transducer is configured for measuring a pressure difference $p_1 - p_2$ by converting the all round pressures $p_1$, $p_2$ into a longitudinal elongation or compression of the at least one fiber Bragg grating of the sensor fiber, wherein a flow rate $v_1$ of a fluid flow is determined from a differential pressure measurement.

13. Use of a fiber optic differential pressure sensor as claimed in claim 12, wherein the differential pressure measurement is carried out at a venturi tube.

14. The fiber optic pressure sensor as claimed in claim 3, wherein the sensor fiber is prestressed.

15. The fiber optic pressure sensor as claimed in claim 6, wherein an error compensation fiber Bragg grating is held between the second and first pressure members in reverse sequence for the purpose of antiphasal change in elongation.

16. The fiber optic pressure sensor as claimed in claim 7, wherein the holder is connected to a common end plate of two serially arranged pressure members.

17. The fiber optic pressure sensor as claimed in claim 7, wherein an error compensation fiber Bragg grating is held between the supporting member and the holder which can be deflected by differential pressure in reverse sequence for the purpose of antiphasal change in elongation.

18. The fiber optic pressure sensor as claimed in claim 9, wherein a pressure or supporting member is assembled from at least two segments with different coefficients of thermal expansion and prescribable lengths L', L".

19. The fiber optic pressure sensor as claimed in claim 1, wherein a plurality of transducers of different Bragg wavelength $\lambda_B$ are optically connected to a broadband light source and via a fiber coupler to a wavelength-division demultiplexer and a detector plus an electronic measuring system.

20. A fiber optic pressure sensor comprising a transducer with a sensor fiber which has at least one fiber Bragg grating, wherein the transducer comprises at least one first pressure member for holding a first medium under an all round pressure $p_1$, the transducer comprises at least one second pressure member for holding a second medium under an all round pressure $p_2$, the transducer is configured for measuring a pressure difference $p_1 - p_2$ by converting the all round pressures $p_1$, $p_2$ into a longitudinal elongation or compression of the at least one fiber Bragg grating of the sensor fiber, and a fiber Bragg grating is provided for differential pressure measurement, and a fiber Bragg grating is provided for error compensation.

21. A fiber optic pressure sensor comprising a transducer with a sensor fiber which has at least one fiber Bragg grating, wherein the transducer comprises at least one first pressure member for holding a first medium under an all round pressure $p_1$, the transducer comprises at least one second pressure member for holding a second medium under an all round pressure $p_2$, the transducer is configured for measuring a pressure difference $p_1-p_2$ by converting the all round pressures $p_1$, $p_2$ into a longitudinal elongation or compression of the at least one fiber Bragg grating of the sensor fiber, and at least one block with a bore for laterally supporting the sensor fiber is provided in the region of a fiber Bragg grating for the purpose of a compression arrangement.

* * * * *